(12) United States Patent
Lin

(10) Patent No.: US 10,749,409 B2
(45) Date of Patent: Aug. 18, 2020

(54) MOTOR

(71) Applicant: Sheng-Lian Lin, Taoyuan (TW)

(72) Inventor: Sheng-Lian Lin, Taoyuan (TW)

( * ) Notice: Subject to any disclaimer, the term of this patent is extended or adjusted under 35 U.S.C. 154(b) by 0 days.

(21) Appl. No.: 16/312,982

(22) PCT Filed: Jun. 22, 2016

(86) PCT No.: PCT/CN2016/086655
§ 371 (c)(1),
(2) Date: Dec. 21, 2018

(87) PCT Pub. No.: WO2017/219259
PCT Pub. Date: Dec. 28, 2017

(65) Prior Publication Data
US 2019/0165646 A1 May 30, 2019

(51) Int. Cl.
| | |
|---|---|
| H02K 7/09 | (2006.01) |
| H02K 1/12 | (2006.01) |
| H02K 7/08 | (2006.01) |
| H02K 1/22 | (2006.01) |
| H02K 5/04 | (2006.01) |
| H02K 11/33 | (2016.01) |
| H02K 1/28 | (2006.01) |
| H02K 5/16 | (2006.01) |

(52) U.S. Cl.
CPC .............. *H02K 7/08* (2013.01); *H02K 1/12* (2013.01); *H02K 1/22* (2013.01); *H02K 1/28* (2013.01); *H02K 5/04* (2013.01); *H02K 5/16* (2013.01); *H02K 7/09* (2013.01); *H02K 11/33* (2016.01)

(58) Field of Classification Search
CPC .............................. H02K 7/09; H02K 1/00–34
USPC ..................................................... 310/90.5
See application file for complete search history.

(56) References Cited

U.S. PATENT DOCUMENTS

| | | | | |
|---|---|---|---|---|
| 5,541,460 | A * | 7/1996 | Dunfield | ................. F16C 17/08 310/268 |
| 7,466,051 | B2 | 12/2008 | Miya et al. | |
| 7,667,364 | B2 | 2/2010 | Niguchi et al. | |
| 2005/0067907 | A1 * | 3/2005 | Takeuchi | ............ F16C 32/0429 310/90.5 |
| 2006/0103249 | A1 | 5/2006 | Miya et al. | |

(Continued)

FOREIGN PATENT DOCUMENTS

| | | |
|---|---|---|
| CN | 101752918 A | 6/2010 |
| CN | 102111026 A | 6/2011 |

(Continued)

*Primary Examiner* — Thomas Truong

(57) ABSTRACT

A motor includes a stator, a rotor, and a first bearing. A housing of the stator has a top wall, a bottom wall opposite, a side wall and a first opening in the top wall. A rotating shaft of the rotor has a first magnetic unit having a first outer surface. The first outer surface includes first and second magnetic pole surfaces alternately arranged. The first and second magnetic pole surfaces have different magnetic poles. The first bearing having a first groove is disposed in the first opening. The first magnetic unit is located in the first groove having a first inner surface facing the first outer surface. The first inner surface includes third and fourth magnetic pole surfaces alternately arranged. The third and fourth magnetic pole surfaces have different magnetic pole. The first and third as well as second and fourth magnetic pole surfaces have the same magnetic poles.

9 Claims, 4 Drawing Sheets

(56) References Cited

U.S. PATENT DOCUMENTS

| | | | |
|---|---|---|---|
| 2009/0033174 A1 | 2/2009 | Niguchi et al. | |
| 2011/0158831 A1 | 6/2011 | Huang et al. | |
| 2014/0132122 A1* | 5/2014 | Furukawa | H02K 5/08 310/68 B |

FOREIGN PATENT DOCUMENTS

| | | |
|---|---|---|
| CN | 204103625 U | 1/2015 |
| CN | 105099021 A | 11/2015 |
| DE | 60222944 T2 | 7/2008 |
| EP | 1548301 B1 | 10/2007 |
| EP | 2020733 A2 | 2/2009 |
| JP | 2002-276659 A | 9/2002 |
| JP | 2009-33927 A | 2/2009 |
| JP | 4756120 B2 | 6/2011 |
| WO | 2004/013504 A1 | 2/2004 |

\* cited by examiner

MOTOR

FIELD OF THE INVENTION

The present invention relates to a motor, and more particularly to a motor capable of effectively increasing energy conversion efficiency.

BACKGROUND OF THE INVENTION

The problem of how to increase motor output power is one of the key technologies that have been innovated, developed and improved since the advent of the motor. In general, the output power of the motor may be increased by directly increasing the size of the motor; however, this way may cause the weight and volume of the motor to increase while the power of the motor is increased. Thus, not all household items or industrial appliances can directly increase the output power of products by increasing the size of the motor. Therefore, how to improve the energy conversion efficiency of the motor is an important research and development direction for those skilled in the art.

SUMMARY OF THE INVENTION

One objective of the present invention is to provide a motor that has improved energy conversion efficiency.

Other objectives and advantages of the present invention will become apparent from the technical features disclosed herein.

To achieve one or a portion or all of the above or other objectives, the present invention provides a motor, which includes a stator, a rotor, and a first bearing. The stator includes a housing. The housing has a top wall, a bottom wall opposite to the top wall, a side wall adjacent between the top wall and the bottom wall, and a first opening defined in the top wall. The rotor includes a rotating shaft. The rotating shaft has a first magnetic unit. The first magnetic unit has a first outer surface. The first outer surface includes a plurality of first magnetic pole surfaces and a plurality of second magnetic pole surfaces which are alternately arranged. Magnetic poles of the first magnetic pole surfaces are different from magnetic poles of the second magnetic pole surfaces. The first bearing is disposed in the first opening. The first bearing has a first groove. The first magnetic unit is located in the first groove. The first groove has a first inner surface facing the first outer surface. The first inner surface includes a plurality of third magnetic pole surfaces and a plurality of fourth magnetic pole surfaces which are alternately arranged. Magnetic poles of the third magnetic pole surfaces are different from magnetic poles of the fourth magnetic pole surfaces. The magnetic poles of the first magnetic pole surfaces are the same as the magnetic poles of the third magnetic pole surfaces. The magnetic poles of the second magnetic pole surfaces are the same as the magnetic poles of the fourth magnetic pole surfaces.

In an embodiment of the invention, the housing further has a second opening defined in the bottom wall. The rotating shaft further has a second magnetic unit. The second magnetic unit has a second outer surface. The second outer surface includes a plurality of fifth magnetic pole surfaces and a plurality of sixth magnetic pole surfaces which are alternately arranged. Magnetic poles of the fifth magnetic pole surfaces are different from magnetic poles of the sixth magnetic pole surfaces. The motor further includes a second bearing disposed in the second opening. The second bearing has a second groove. The second magnetic unit is located in the second groove. The second groove has a second inner surface facing the second outer surface. The second inner surface includes a plurality of seventh magnetic pole surfaces and a plurality of eighth magnetic pole surfaces which are alternately arranged. Magnetic poles of the seventh magnetic pole surfaces are different from magnetic poles of the eighth magnetic pole surfaces. The magnetic poles of the fifth magnetic pole surfaces are the same as the magnetic poles of the seventh magnetic pole surfaces. The magnetic poles of the sixth magnetic pole surfaces are the same as the magnetic poles of the eighth magnetic pole surfaces.

In an embodiment of the invention, the first magnetic unit further has a first top surface and a first bottom surface opposite to the first top surface. The first outer surface is adjacent between the first top surface and the first bottom surface. The first top surface is adjacent to the top wall of the housing. The first bottom surface is adjacent to the bottom wall of the housing. The first magnetic unit is tapered from the first bottom surface toward the first top surface to form a conical structure. The first groove is a conical groove that matches a shape of the first magnetic unit.

In an embodiment of the invention, the second magnetic unit further has a second top surface and a second bottom surface opposite to the second top surface. The second outer surface is adjacent between the second top surface and the second bottom surface. The second top surface is adjacent to the top wall of the housing. The second bottom surface is adjacent to the bottom wall of the housing. The second magnetic unit is tapered from the second top surface toward the second bottom surface to form a conical structure. The second groove is a conical groove that matches a shape of the second magnetic unit.

In an embodiment of the invention, the stator further includes a stator magnetic conductive structure. The stator magnetic conductive structure is annularly disposed on an inner surface of the side wall and located between the top wall and the bottom wall. The stator magnetic conductive structure surrounds the rotor.

In an embodiment of the invention, the stator further includes a driving circuit board disposed in the housing and electrically connected to the stator magnetic conductive structure.

In an embodiment of the invention, the stator magnetic conductive structure includes at least one silicon steel sheet, an insulating unit and a coil unit. The insulating unit is disposed between the silicon steel sheet and the coil unit.

In an embodiment of the invention, the rotor further includes a rotor magnetic conductive structure. The stator magnetic conductive structure surrounds the rotor magnetic conductive structure. The rotating shaft passes through the rotor magnetic conductive structure.

In an embodiment of the invention, the rotor magnetic conductive structure includes a magnet unit and a magnetic conductive unit. The magnetic conductive unit is disposed between the magnet unit and the rotating shaft.

In summary, in the motor of the embodiments of the present invention, the rotating shaft is driven to rotate by the attractive force and repulsive force generated between the first magnetic unit of the rotating shaft and the first bearing and the attractive force and repulsive force generated between the second magnetic unit and the second bearing. Further, the appearance shape of the first magnetic unit is a conical structure, the first bearing has a shape that matches the appearance of the first magnetic unit, the appearance shape of the second magnetic unit is a conical structure, and the second bearing has a shape that matches the appearance of the second magnetic unit. Through such a driving method and with the structural design of the first magnetic unit, the second magnetic unit, the first bearing and the second bearing, the energy conversion efficiency of the motor is improved and the power saving effect is also achieved.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
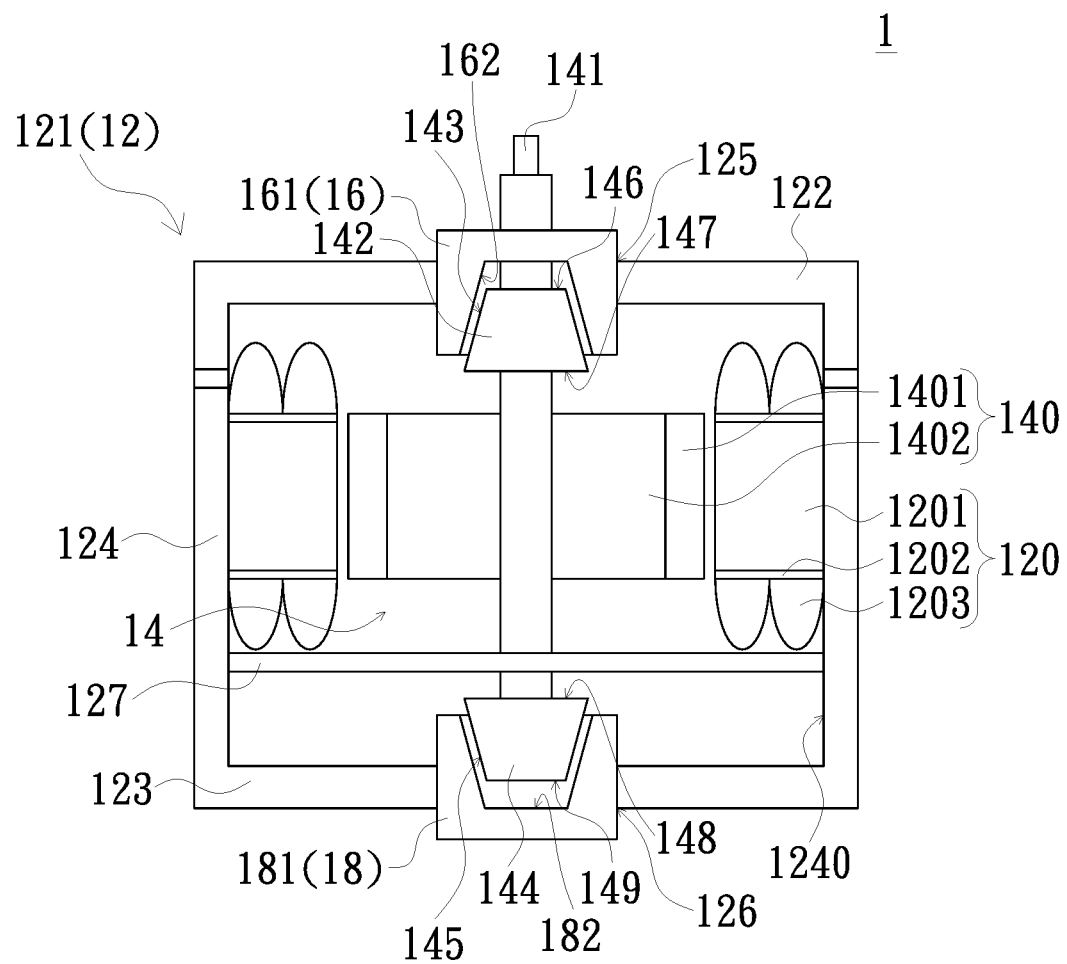
FIG. 1 is a schematic cross-sectional view of a motor according to an embodiment of the present invention.
Figure 2:
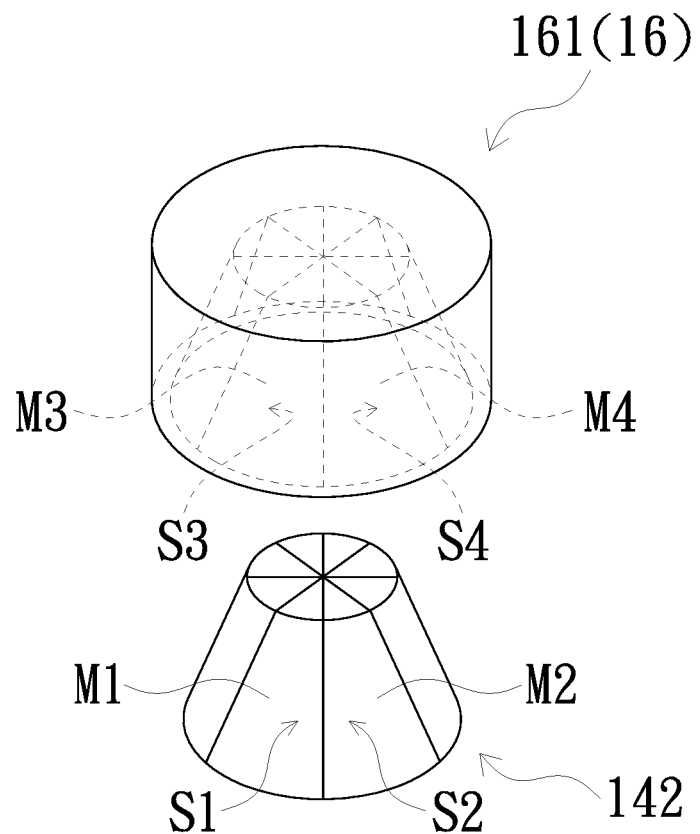
FIG. 2 is a schematic perspective structural view of the first magnetic unit and the first bearing shown in FIG. 1.
Figure 3:
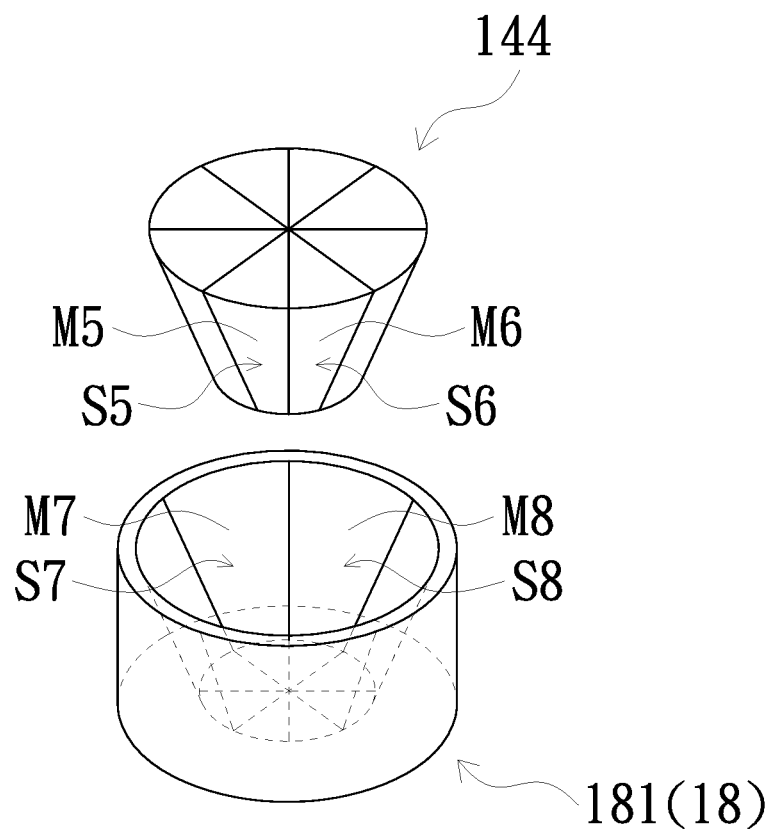
FIG. 3 is a schematic perspective structural view of the second magnetic unit and the second bearing shown in FIG. 1.

Refer to FIGS. 1 to 3. FIG. 1 is a schematic cross-sectional view of a motor according to an embodiment of the present invention. FIG. 2 is a schematic perspective structural view of the first magnetic unit and the first bearing shown in FIG. 1. FIG. 3 is a schematic perspective structural view of the second magnetic unit and the second bearing shown in FIG. 1. As shown in FIGS. 1 and 2, the motor 1 of the present embodiment includes a stator 12, a rotor 14, and a first bearing 16. The stator 12 includes a housing 121. The housing 121 has a top wall 122, a bottom wall 123 opposite to the top wall 122, a side wall 124 adjacent between the top wall 122 and the bottom wall 123, and a first opening 125 defined in the top wall 122. The rotor 14 includes a rotating shaft 141. The rotating shaft 141 passes through the first opening 125 of the housing 121 and protrudes out of the housing 121. The rotating shaft 141 has a first magnetic unit 142. The first magnetic unit 142 has a first outer surface 143. The first outer surface 143 includes a plurality of first magnetic pole surfaces S1 and a plurality of second magnetic pole surfaces S2 alternately arranged, and the magnetic poles of the first magnetic pole surfaces S1 are different from the magnetic poles of the second magnetic pole surfaces S2. The first bearing 16 is disposed in the first opening 125 of the housing 121 and the rotating shaft 141 passes through the first bearing 16. The first bearing 16 has a first groove 161, and the first magnetic unit 142 of the rotating shaft 141 is located in the first groove 161. The first groove 161 has a first inner surface 162 that faces the first outer surface 143. The first inner surface 162 includes a plurality of third magnetic pole surfaces S3 and a plurality of fourth magnetic pole surfaces S4 which are alternately arranged, and the magnetic poles of the third magnetic pole surfaces S3 are different from the magnetic poles of the fourth magnetic pole surfaces S4. Further, in the present embodiment, the first magnetic pole surfaces S1 of the first magnetic unit 142 and the third magnetic pole surfaces S3 of the first bearing 16 have the same magnetic pole, and the second magnetic pole surfaces S2 of the first magnetic unit 142 and the fourth magnetic pole surfaces S4 of the first bearing 16 have the same magnetic pole.

As shown in FIGS. 1 and 3, the housing 121 of the present embodiment further has a second opening 126 defined in the bottom wall 123. The rotating shaft 141 further has a second magnetic unit 144. The second magnetic unit 144 has a second outer surface 145. The second outer surface 145 includes a plurality of fifth magnetic pole surfaces S5 and a plurality of sixth magnetic pole surfaces S6 alternately arranged, and the magnetic poles of the fifth magnetic pole surfaces S5 are different from the magnetic poles of the sixth magnetic pole surfaces S6. The motor 1 of the present embodiment further includes a second bearing 18 disposed in the second opening 126 of the housing 121. The second bearing 18 has a second groove 181, and the second magnetic unit 144 is located in the second groove 181. The second groove 181 has a second inner surface 182 that faces the second outer surface 145. The second inner surface 182 includes a plurality of seventh magnetic pole surfaces S7 and a plurality of eighth magnetic pole surfaces S8 which are alternately arranged, and the magnetic poles of the seventh magnetic pole surfaces S7 are different from the magnetic poles of the eighth magnetic pole surfaces S8. Further, in the present embodiment, the fifth magnetic pole surfaces S5 of the second magnetic unit 144 and the seventh magnetic pole surfaces S7 of the second bearing 18 have the same magnetic pole, and the sixth magnetic pole surfaces S6 and the second of the second magnetic unit 144 and the eighth magnetic pole surfaces S8 of the second bearings 18 have the same magnetic pole.

In the present embodiment, it should be noted that the first magnetic pole surface S1 and the second magnetic pole surface S2 of the first magnetic unit 142 are the surfaces of the first magnet unit M1 and the second magnet unit M2, respectively. The number of the first magnetic pole surfaces S1 and the number of the second magnetic pole surfaces S2 are four, for example; that is, the number of the first magnet units M1 and the number of the second magnet units M2 are four, respectively. Correspondingly, the third magnetic pole surface S3 and the fourth magnetic pole surface S4 of the first bearing 16 are the surfaces of the third magnet unit M3 and the fourth magnet unit M4, respectively. The number of the third magnetic pole surface S3 and the number of the fourth magnetic pole surface S4 are four, for example; that is, the number of the third magnet unit M3 and the number of the fourth magnet unit M4 are four, respectively. In addition, in the present embodiment, the fifth magnetic pole surface S5 and the sixth magnetic pole surface S6 of the second magnetic unit 144 are the surfaces of the fifth magnet unit M5 and the sixth magnet unit M6, respectively. The number of the fifth magnetic pole surface S5 and the number of the sixth magnetic pole surfaces S6 are four, for example; that is, the number of the fifth magnet units M5 and the number of the sixth magnet units M6 are four, respectively. Correspondingly, the seventh magnetic pole surface S7 and the eighth magnetic pole surface S8 of the second bearing 18 are the surfaces of the seventh magnet unit M7 and the eighth magnet unit M8, respectively. The number of the seventh magnetic pole surfaces S7 and the number of the eighth magnetic pole surfaces S8 are four, for example; that is, the number of the seventh magnet units M7 and the number of the eighth magnet units M8 are four, respectively.

The numbers of the first magnetic pole surfaces S1, the second magnetic pole surfaces S2, the third magnetic pole surfaces S3, the fourth magnetic pole surfaces S4, the fifth magnetic pole surfaces S5, the sixth magnetic pole surfaces S6, the seventh magnetic pole surfaces S7 and the eighth magnetic pole surfaces S8 being four is only one of the embodiments of the present invention, and the present invention is not limited thereto. The numbers of the first magnetic pole surfaces S1, the second magnetic pole surfaces S2, the third magnetic pole surfaces S3, the fourth magnetic pole surfaces S4, the fifth magnetic pole surfaces S5, the sixth magnetic pole surfaces S6, the seventh magnetic pole surfaces S7, and the eighth magnetic pole surfaces S8 may vary depending on the actual situation. Further, the first magnet units M1 and the second magnet units M1 are connected to each other, the third magnet units M3 and the fourth magnet units M4 are connected to each other, the fifth magnet units M5 and the sixth magnet units M6 are connected to each other, and the seventh magnet units M7 and the eighth magnet units M8 are connected to each other.

The detailed structure of the motor 1 of the embodiment of the present invention will be further described below.

As shown in FIG. 1, the first magnetic unit 142 of the rotating shaft 141 of the present embodiment further has a first top surface 146 and a first bottom surface 147 opposite to the first top surface 146, and the first outer surface 143 is adjacent between the first top surface 146 and the first bottom surface 147. The first top surface 146 of the first magnetic unit 142 is adjacent to the top wall 122 of the housing 121, and the first bottom surface 147 is adjacent to the bottom wall 123 of the housing 121. The first magnetic unit 142 is tapered from the first bottom surface 147 toward the first top surface 146 to form a conical structure, and the first groove 161 of the first bearing 16 is a conical groove that matches the shape of the first magnetic unit 142. Specifically, the first magnetic unit 142 of the present embodiment is, for example, a truncated conical structure, that is, the cross-sectional shape of the first magnetic unit 142 is a trapezoid-like structure; the first groove 161 of the first bearing 16 is, for example, a truncated conical groove that matches the truncated conical structure, that is, the cross-sectional shape of the first groove 161 is a trapezoid-like structure; but the invention is not limited thereto.

As shown in FIG. 1, the second magnetic unit 144 of the rotating shaft 141 of the present embodiment further has a second top surface 148 and a second bottom surface 149 opposite to the second top surface 148, and the second outer surface 145 is adjacent between the second top surface 148 and the second bottom surface 149. The second top surface 148 of the second magnetic unit 144 is adjacent to the top wall 122 of the housing 121, and the second bottom surface 149 is adjacent to the bottom wall 123 of the housing 121. The second magnetic unit 144 is tapered from the second top surface 148 toward the second bottom surface 149 to form a conical structure, and the second groove 181 of the second bearing 18 is a conical groove that matches the shape of the second magnetic unit 144. Specifically, the second magnetic unit 144 of the present embodiment is, for example, a truncated conical structure, that is, the cross-sectional shape of the second magnetic unit 144 is a trapezoid-like structure; the second groove 181 of the second bearing 18 is, for example, a truncated conical groove that matches the truncated conical structure; but the invention is not limited thereto.

As shown in FIG. 1, the stator 12 of the present embodiment further includes a stator magnetic conductive structure 120. The stator magnetic conductive structure 120 is annularly disposed on the inner surface 1240 of the side wall 124 of the housing 121 and located between the top wall 122 and the bottom wall 123, and the stator magnetic conductive structure 120 surrounds the rotor 14. Specifically, the stator magnetic conductive structure 120 of the present embodiment includes at least one silicon steel sheet 1201, an insulating unit 1202, and a coil unit 1203. The insulating unit 1202 is located between the silicon steel sheet 1201 and the coil unit 1203. It should be noted that the present invention does not limit the number of the silicon steel sheets 1201, and the number of the silicon steel sheets 1201 is, for example, one or more; wherein the silicon steel sheets 1201 are stacked on each other of the number of the silicon steel sheets 1201 is more than one.

As shown in FIG. 1, the rotor 14 of the present embodiment further includes a rotor magnetic conductive structure 140. In the present embodiment, the stator magnetic conductive structure 120 surrounds the rotor magnetic conductive structure 140, and the rotating shaft 141 passes through the rotor magnetic conductive structure 140. Specifically, the rotor magnetic conductive structure 140 includes a magnet unit 1401 and a magnetic conductive unit 1402. The magnetic conductive unit 1402 is disposed between the magnet unit 1401 and the rotating shaft 141. The rotating shaft 141 passes through the magnetic conductive unit 1402. In the present embodiment, the magnet unit 1401 is, for example, a permanent magnet, but the invention is not limited thereto.

As shown in FIG. 1, the stator 12 of the present embodiment further includes a driving circuit board 127. The driving circuit board 127 is disposed in the housing 121 and electrically connected to the stator magnetic conductive structure 120. Specifically, an air gap is formed between the silicon steel sheet 1201 of the stator 12 and the magnet unit 1401 of the rotor 14. The driving circuit board 127 generates a driving signal to energize the coil unit 1203 of the stator magnetic conductive structure 120. The energized coil unit 1203 can generate an alternating magnetic field through the air gap between the stator 12 and the rotor 14, thereby driving the rotor 14 to rotate.

When the motor 1 of the present embodiment is in the activated state, the attractive force and repulsive force are generated between the first magnetic pole surfaces S1, the second magnetic pole surfaces S2 of the first magnetic unit 142 and the third magnetic pole surfaces S3, the fourth magnetic pole surfaces S4 of the first bearing 16; and the attractive force and repulsive force are generated between the fifth magnetic pole surfaces S5, the sixth magnetic pole surfaces S6 of the second magnetic unit 144 and the seventh magnetic pole surfaces S7, the eighth magnetic pole surfaces S8 of the second bearing 18. Therefore, when the driving circuit board 127 of the stator 12 generates the driving signal to drive the rotor 14 to rotate, the rotating shaft 141 can be further driven to rotate by the continuous attractive force and repulsive force between the first magnetic unit 142 and the first bearing 16 and the continuous attractive force and repulsive force between the second magnetic unit 144 and the second bearing 18. Such a driving manner can further improve the energy conversion efficiency of the motor 1, in other words, the motor 1 has better power saving effect by such driving method.

Figure 4:
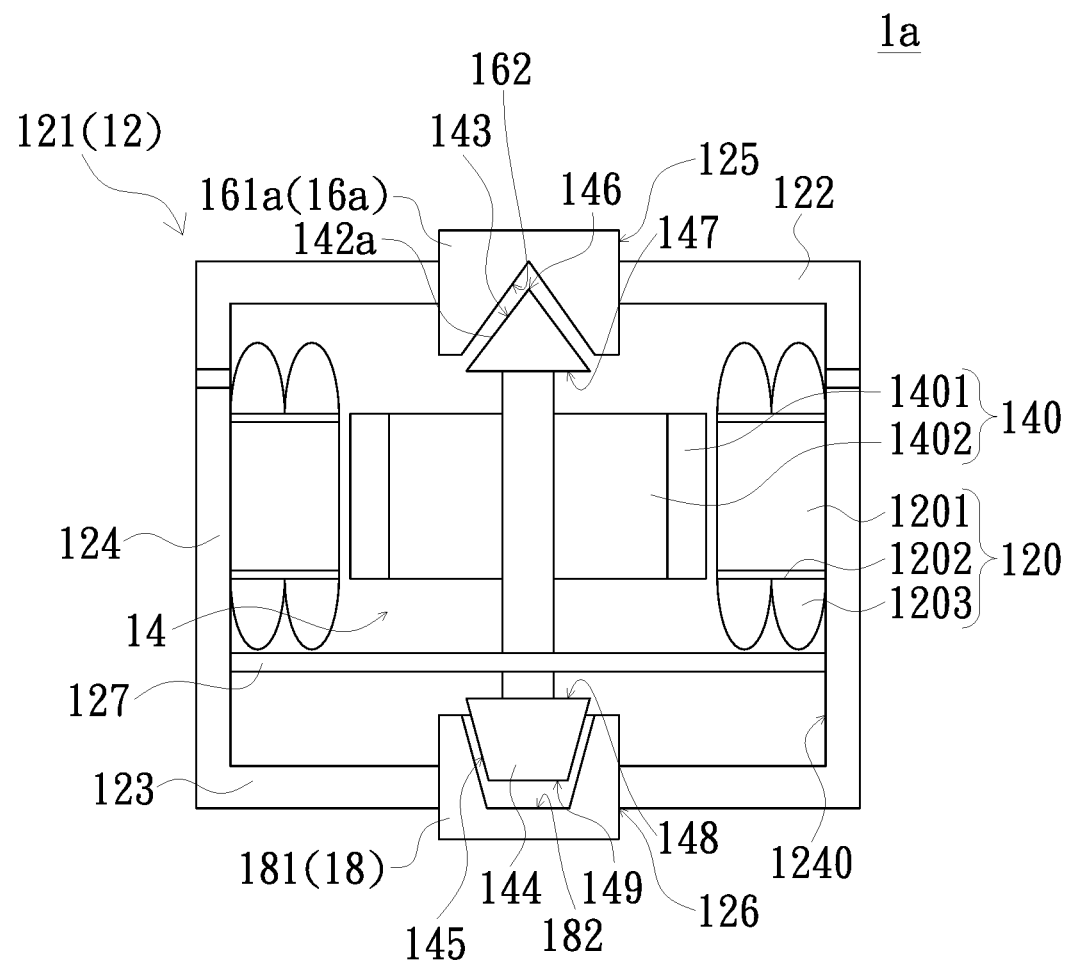
FIG. 4 is a cross-sectional view of a motor according to another embodiment of the present invention.

FIG. 4 is a cross-sectional view of a motor 1a according to another embodiment of the present invention. As shown in FIG. 4, the motor 1a of the present embodiment is similar to the motor 1 shown in FIG. 1, and the difference lies in that the cross-sectional shape of the first magnetic unit 142a of the motor 1a of the present embodiment is, for example, a triangular conical structure. The first groove 161a of the first bearing 16a is a conical groove that matches the shape of the first magnetic unit 142a, that is, the cross-sectional shape of the first groove 161a is a triangle that matches the cross-sectional shape of the first magnetic unit 142a. In an embodiment, it should be noted that the cross-sectional shape of the second magnetic unit 144 may also be a triangular conical structure, and the cross-sectional shape of the second groove 181 may also be a triangle that matches the cross-sectional shape of the second magnetic unit 144. That is, the first magnetic unit 142a and the second magnetic unit 144 have the same cross-sectional shape, and the first groove 161a and the second grove 181 have the same cross-sectional shape.

In summary, in the motor of the embodiments of the present invention, the rotating shaft is driven to rotate by the attractive force and repulsive force generated between the first magnetic unit of the rotating shaft and the first bearing and the attractive force and repulsive force generated between the second magnetic unit and the second bearing. Further, the appearance shape of the first magnetic unit is a conical structure, the first bearing has a shape that matches the appearance of the first magnetic unit, the appearance shape of the second magnetic unit is a conical structure, and the second bearing has a shape that matches the appearance of the second magnetic unit. Through such a driving method and with the structural design of the first magnetic unit, the second magnetic unit, the first bearing and the second bearing, the energy conversion efficiency of the motor is improved and the power saving effect is also achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor, comprising:
   a stator, comprising a housing, wherein the housing has a top wall, a bottom wall opposite to the top wall, a side wall adjacent between the top wall and the bottom wall, and a first opening defined in the top wall;
   a rotor, comprising a rotating shaft, wherein the rotating shaft has a first magnetic unit, the first magnetic unit has a first outer surface, the first outer surface comprises a plurality of first magnetic pole surfaces and a plurality of second magnetic pole surfaces which are alternately arranged, and magnetic poles of the first magnetic pole surfaces are different from magnetic poles of the second magnetic pole surfaces; and
   a first bearing, disposed in the first opening, wherein the first bearing has a first groove, the first magnetic unit is located in the first groove, the first groove has a first inner surface facing the first outer surface, the first inner surface comprises a plurality of third magnetic pole surfaces and a plurality of fourth magnetic pole surfaces which are alternately arranged, magnetic poles of the third magnetic pole surfaces are different from magnetic poles of the fourth magnetic pole surfaces, the magnetic poles of the first magnetic pole surfaces are the same as the magnetic poles of the third magnetic pole surfaces, and the magnetic poles of the second magnetic pole surfaces are the same as the magnetic poles of the fourth magnetic pole surfaces.

2. The motor according to claim 1, wherein the housing further has a second opening defined in the bottom wall, the rotating shaft further has a second magnetic unit, the second magnetic unit has a second outer surface, the second outer surface comprises a plurality of fifth magnetic pole surfaces and a plurality of sixth magnetic pole surfaces which are alternately arranged, magnetic poles of the fifth magnetic pole surfaces are different from magnetic poles of the sixth magnetic pole surfaces, the motor further comprises a second bearing disposed in the second opening, the second bearing has a second groove, the second magnetic unit is located in the second groove, the second groove has a second inner surface facing the second outer surface, the second inner surface comprises a plurality of seventh magnetic pole surfaces and a plurality of eighth magnetic pole surfaces which are alternately arranged, magnetic poles of the seventh magnetic pole surfaces are different from magnetic poles of the eighth magnetic pole surfaces, the magnetic poles of the fifth magnetic pole surfaces are the same as the magnetic poles of the seventh magnetic pole surfaces, and the magnetic poles of the sixth magnetic pole surfaces are the same as the magnetic poles of the eighth magnetic pole surfaces.

3. The motor according to claim 2, wherein the first magnetic unit further has a first top surface and a first bottom surface opposite to the first top surface, the first outer surface is adjacent between the first top surface and the first bottom surface, the first top surface is adjacent to the top wall of the housing, the first bottom surface is adjacent to the bottom wall of the housing, the first magnetic unit is tapered from the first bottom surface toward the first top surface to form a conical structure, and the first groove is a conical groove that matches a shape of the first magnetic unit.

4. The motor according to claim 2, wherein the second magnetic unit further has a second top surface and a second bottom surface opposite to the second top surface, the second outer surface is adjacent between the second top surface and the second bottom surface, the second top surface is adjacent to the top wall of the housing, the second bottom surface is adjacent to the bottom wall of the housing, the second magnetic unit is tapered from the second top surface toward the second bottom surface to form a conical structure, and the second groove is a conical groove that matches a shape of the second magnetic unit.

5. The motor according to claim 1, wherein the stator further comprises a stator magnetic conductive structure, the stator magnetic conductive structure is annularly disposed on an inner surface of the side wall and located between the top wall and the bottom wall, and the stator magnetic conductive structure surrounds the rotor.

6. The motor according to claim 5, wherein the stator further comprises a driving circuit board disposed in the housing and electrically connected to the stator magnetic conductive structure.

7. The motor according to claim 5, wherein the stator magnetic conductive structure comprises at least one silicon steel sheet, an insulating unit and a coil unit, and the insulating unit is disposed between the silicon steel sheet and the coil unit.

8. The motor according to claim 5, wherein the rotor further comprises a rotor magnetic conductive structure, the stator magnetic conductive structure surrounds the rotor magnetic conductive structure, and the rotating shaft passes through the rotor magnetic conductive structure.

9. The motor according to claim 8, wherein the rotor magnetic conductive structure comprises a magnet unit and a magnetic conductive unit, and the magnetic conductive unit is disposed between the magnet unit and the rotating shaft.

* * * * *